United States Patent
Peters et al.

[11] 3,874,864
[45] Apr. 1, 1975

[54] GLASSMAKING DIAMETER SENSING

[75] Inventors: Homer D. Peters, Sylvania; Robert R. Rough, Toledo, both of Ohio

[73] Assignee: Owens-Illinois, Inc., Toledo, Ohio

[22] Filed: Apr. 16, 1973

[21] Appl. No.: 351,458

[52] U.S. Cl. .................. 65/29, 65/160, 65/164, 73/37.6, 73/290 R
[51] Int. Cl. ............................................. C03b 5/00
[58] Field of Search ............... 65/160, 29, 164, 158; 33/126.7 A, 126, 172 E; 73/290, 37.5, 37.6

[56] References Cited
UNITED STATES PATENTS

| | | | |
|---|---|---|---|
| 2,737,807 | 3/1956 | Brichard | 73/37.5 X |
| 3,129,084 | 4/1964 | Labino | 65/134 X |
| 3,213,670 | 10/1965 | MacGeorge | 73/37.6 |
| 3,348,936 | 10/1967 | Clark et al. | 65/160 |
| 3,470,733 | 10/1969 | Rule et al. | 73/37.5 |
| 3,502,457 | 3/1970 | Publitz et al. | 65/164 X |
| 3,754,886 | 8/1973 | Richards et al. | 65/134 |

*Primary Examiner*—S. Leon Bashore
*Assistant Examiner*—Kenneth M. Schor
*Attorney, Agent, or Firm*—E. F. Dwyer; E. J. Holler

[57] ABSTRACT

A method and apparatus for controlling the amount of glass in a mass of glass which is being refined by introducing unrefined molten glass continuously into one end of an open-ended container, rotating the container to provide a void in the mass of glass in the container and cause the gaseous inclusions therein to be removed by the action of centrifugal force, and continuously removing the glass from the other end of the container. An air probe is moved radially in the void toward the inner surface of the glass, and when the probe reaches a predetermined relationship to the surface of the glass, the probe senses a change in pressure to produce a signal corresponding to the diameter of the void which in turn is a measure of the amount of glass in the container.

2 Claims, 11 Drawing Figures

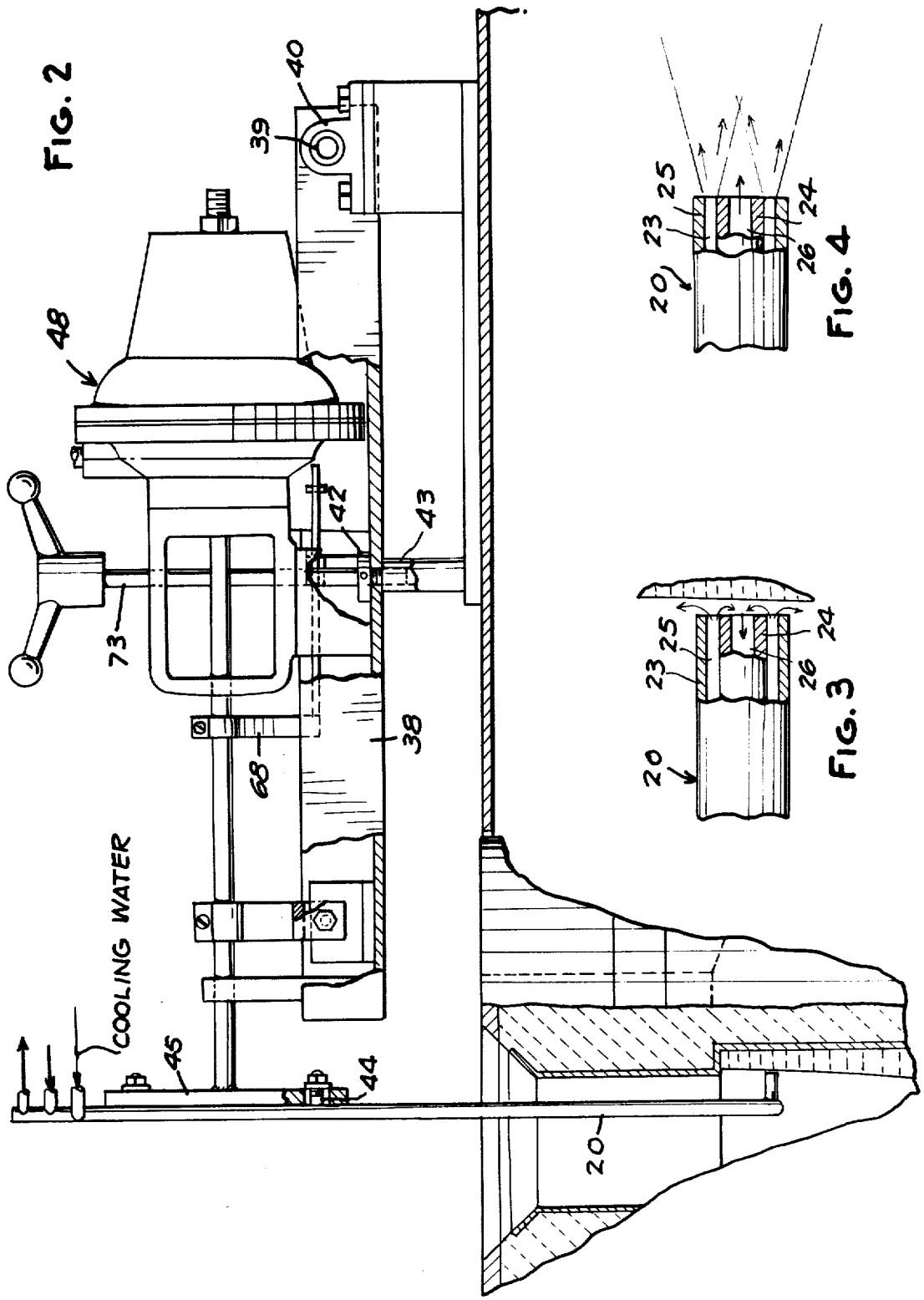

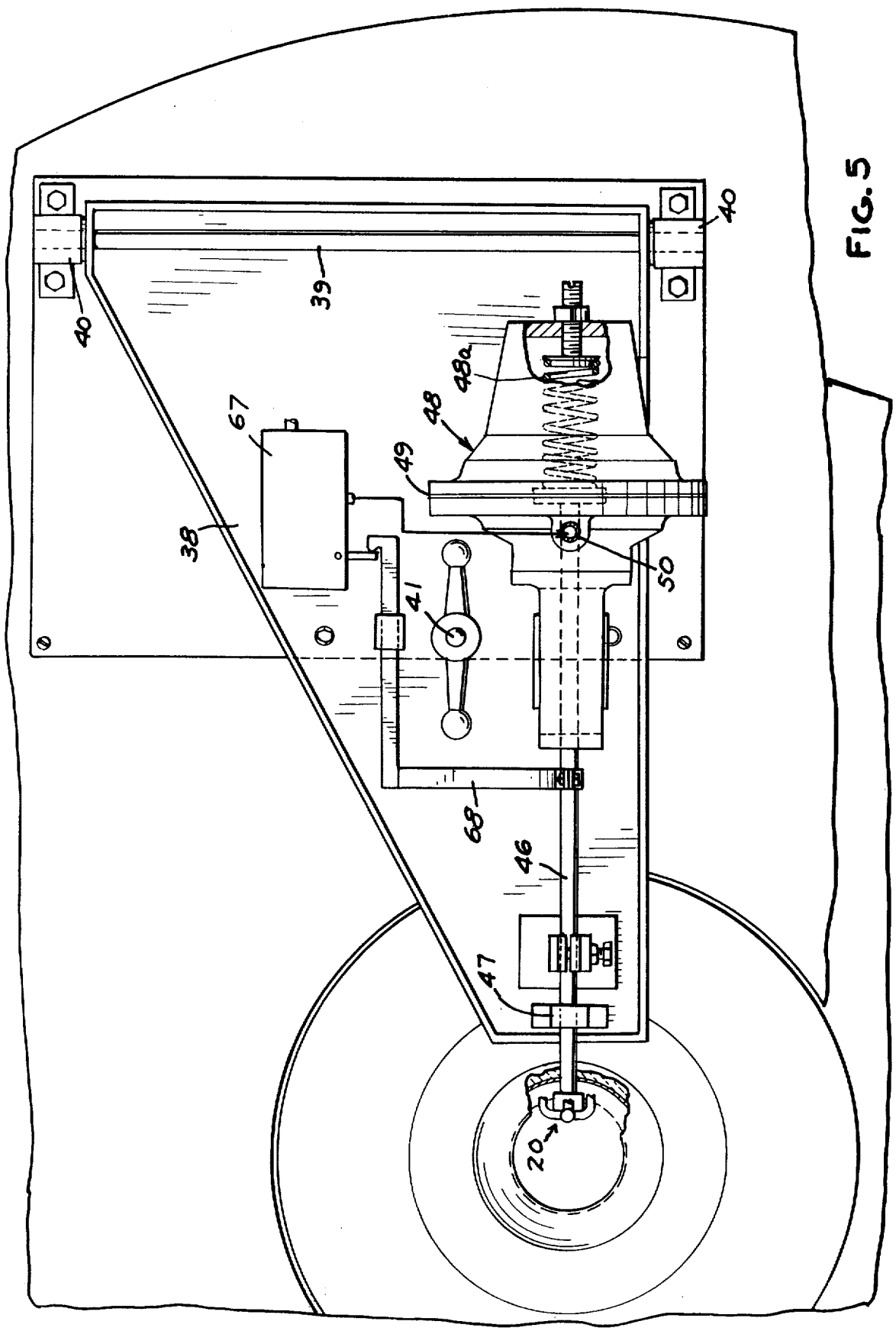

GLASSMAKING DIAMETER SENSING

This invention relates to refining molten glass and more particularly to refining molten glass by subjecting the glass to centrifugal action in a rotating container, and particularly to a method and apparatus for sensing and controlling the amount of glass in the container.

BACKGROUND OF THE INVENTION

In the copending application of Richards et al., Ser. No. 130,672, filed Apr. 2, 1971 now U.S. Pat. No. 3,754,886, having a common assignee with the present application, there is disclosed and claimed a method and apparatus for refining glass wherein the unrefined molten glass is continuously introduced into one end of an open-ended chamber or container, the chamber is rotated to form a void and the glass is subjected to centrifugal action to cause the gaseous inclusions in the glass to migrate toward the center of the void, and finally the glass is continuously withdrawn from the other end of the open-ended chamber. In order to provide for accurate control of the degree of refining, it is important to know the amount of glass in the rotating container. In order to control the amount of glass in the chamber, a rod or other device is provided in the other end of the chamber to restrict the flow of glass out of the chamber.

Among the objects of the invention are to provide a method and apparatus for measuring the amount of glass in the chamber by sensing the diameter of the void in the rotating mass of glass; which will automatically and continuously monitor the amount of glass in the chamber; which method and apparatus is relatively simple and inexpensive; which apparatus will withstand the temperatures involved and wherein the sensing is achieved without contact with the glass.

SUMMARY OF THE INVENTION

In accordance with the invention, an air probe is moved radially outwardly toward the surface of the void in the rotating mass of glass. When the probe reaches a predetermined spaced relation with the glass, a change in air pressure is sensed to produce a signal corresponding to the diameter of the void which, in turn, is a measure of the amount of glass being rotated. On the basis of this measurement, the amount of glass in the container is controlled.

DESCRIPTION OF THE DRAWINGS

FIG. 2 is a part sectional elevational view on an enlarged scale of a portion of the apparatus shown in FIG. 1.

FIGS. 3 and 4 are partly diagrammatic views showing the manner of operation of a portion of the apparatus shown in FIG. 1.

FIG. 5 is a fragmentary plan view of the apparatus shown in FIG. 1.

DESCRIPTION

Figure 1:
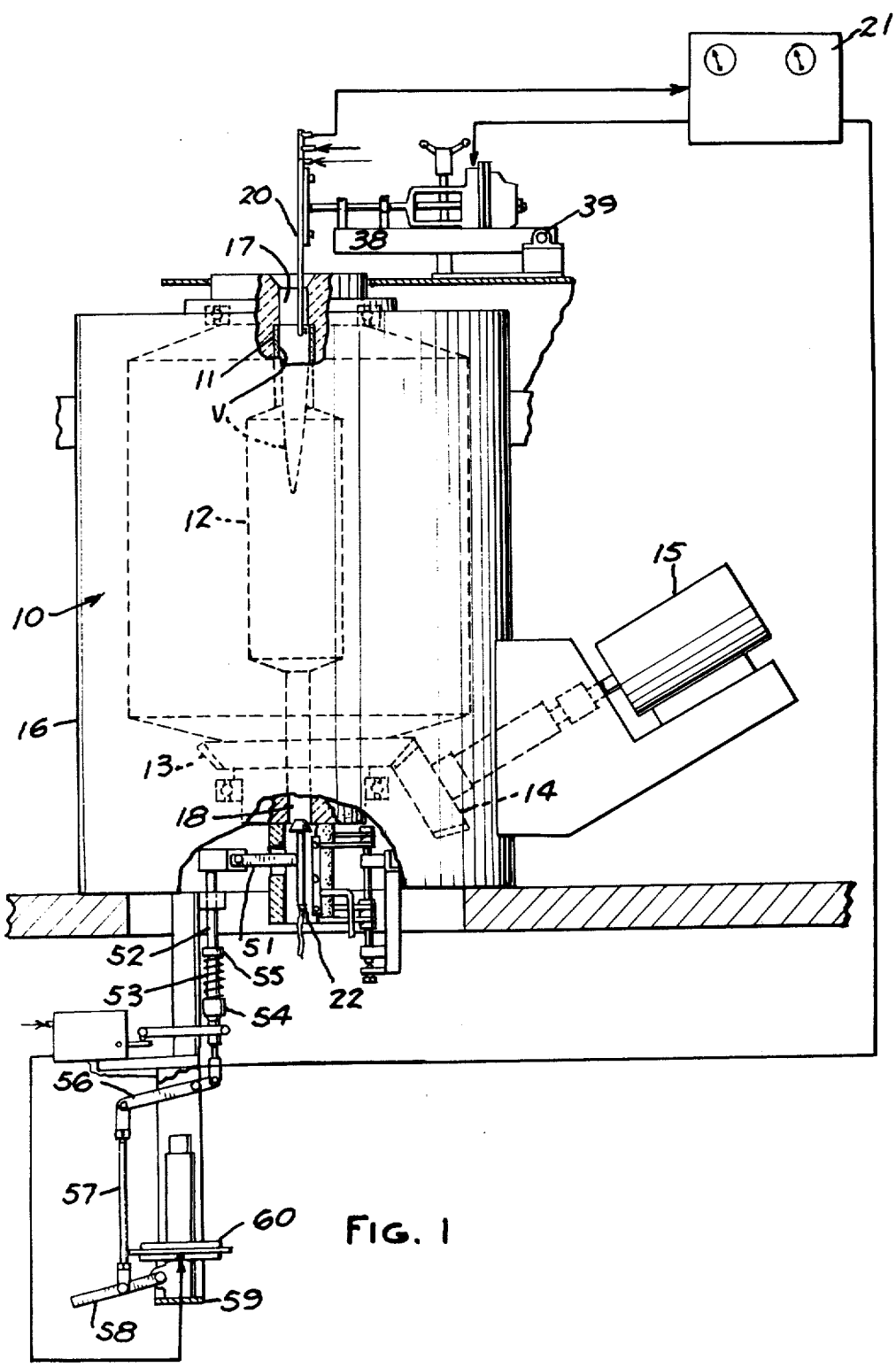
FIG. 1 is a part sectional, partly diagrammatic elevational view of an apparatus embodying the invention.
Figure 6:
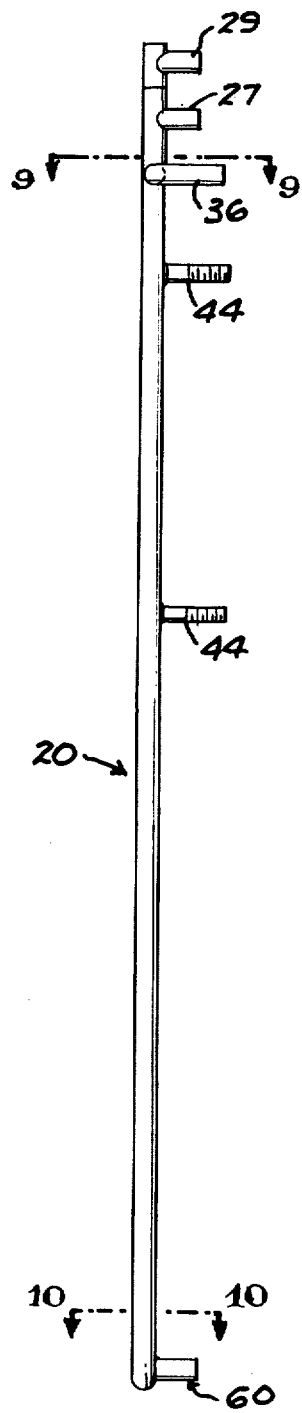
FIG. 6 is a side elevational view of the probe shown in FIGS. 1-5.
Figure 7:
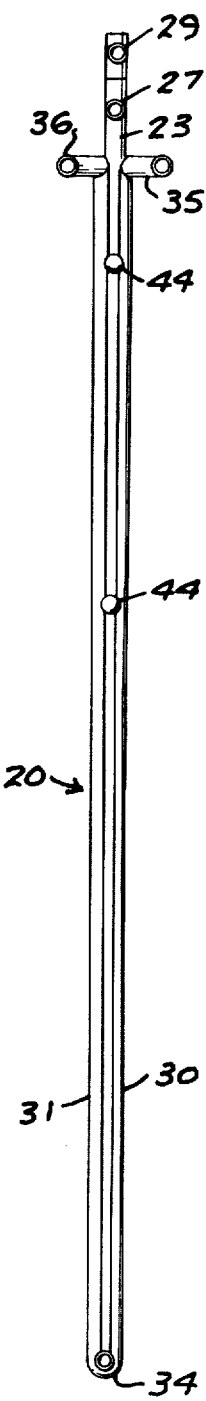
FIG. 7 is a front elevational view of the probe.
Figure 8:
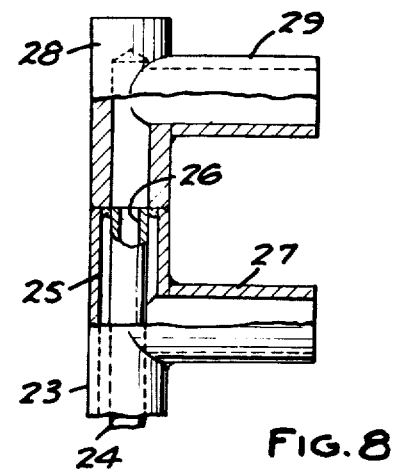
FIG. 8 is a part sectional side view on an enlarged scale of a portion of the probe shown in FIG. 6.
Figure 9:
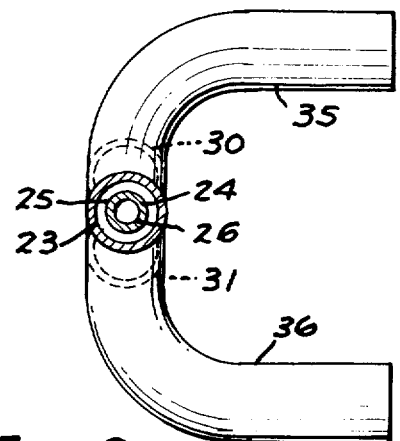
FIG. 9 is a sectional view on an enlarged scale taken along the line 9—9 in FIG. 6.
Figure 10:
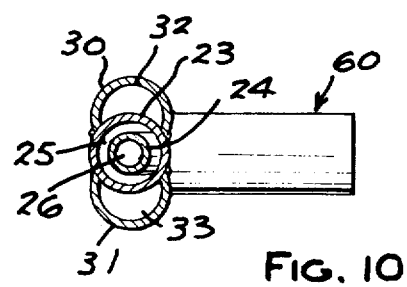
FIG. 10 is a sectional view on an enlarged scale taken along the line 10—10 in FIG. 1.

Referring to FIG. 1, the apparatus shown comprises a rotatable container 10 that has a refractory liner 11 defining a chamber 12. The upper and lower ends of the chamber 12 are open, and the container 10 is adapted to be rotated by meshing bevel gears 13, 14 which are rotated by a motor 15. The rotating container 10 is surrounded by stationary housing 16.

Glass is continuously introduced into the open upper end 17 of the container and upon rotation of the container, a void V is produced due to centrifugal action. Gaseous inclusions in the glass are caused to move to the void, thus converting the unrefined molten glass to refined molten glass. The refined molten glass passes downwardly through the outlet 18 continuously. The aforementioned and described apparatus is more completely disclosed and described in the aforementioned patent application, Ser. No. 130,672, filed Apr. 2, 1971.

In accordance with the invention, the diameter of the inner surface of the glass at a point adjacent the upper end of the void V is continuously sensed, and this is used to control the efflux of glass from the outlet 18 or the feeding of unrefined molten glass to the chamber.

More specifically, as shown in FIGS. 1, 2 and 5, a probe 20 is yieldingly urged radially outwardly toward the surface of the glass and the probe 20 senses the diameter of the glass at that point. This, in turn, is a measure of the amount of glass in the chamber 12. The position is converted to an electrical signal and directed to a comparator 21 that compares the position with a predetermined standard and produces a control signal to control the position of a rod 22 vertically toward and away from the outlet 18, thereby controlling the rate at which the glass leaves the chamber 12, or the feeding of unrefined molten glass to the chamber.

As shown in FIGS. 6-10, the probe 20 comprises concentric tubes 23, 24 defining an annular pressure passage 25 and a central pressure sensing passage 26. A fitment 27 at the upper end of the probe extends laterally to form an air inlet. The lower ends of tubes 23, 24 extend laterally and air under predetermined constant pressure is forced outwardly through passage 25. If no glass is present, the air will flow outwardly diagrammatically as shown in FIG. 4. However, if glass is present, the air will be redirected through central passage 26 (FIG. 3). A second fitment 28 on the upper end of probe 20 communicates with passage 26 and has a lateral outlet 29 through which the pressure in central passage 26 is applied to the comparator 21 which functions to determine the pressure differential which is a measure of diameter. The comparator then functions to control the position of the rod 22, as presently described.

Provision is made for cooling and maintaining the probe at a predetermined temperature and comprises arcuate portions 30, 31 welded to opposite sides of tube 23 to define passages 32, 33 which communicate at the bottom of the probe at 34. Tubes 35, 36 communicate with passages 32, 33 to provide an inlet and an outlet so that cooling liquid such as water can be circulated through the passages 32, 33 to cool the tubes.

The entire sensing assembly is mounted on a plate 38 pivoted on a rod 39 between pillow blocks 40 so that the apparatus can be swung into and out of position. A threaded shaft 41 having a collar 42 thereon is threaded into a post 43 to lock the sensing assembly in sensing position.

The probe 20 is mounted by bolts 44 on a bracket 45 fixed to a shaft 46, which extends through a bearing 47 into a diaphragm motor 48. The end of the shaft is fastened to a diaphragm 49 within the diaphragm motor housing. Air under predetermined pressure applied to diaphragm 49 through a passage 50 in that portion of the housing is to the left of the diaphragm as viewed in FIGS. 2 and 5 which yieldingly urges the probe 20 radially toward the glass against the action of a spring 48a in the housing.

Referring to FIG. 1, the rod 22 that controls the efflux of glass has a laterally extending projection 51 which, in turn, is fixed to the upper end of shaft 52. The shaft 52 is tensioned upwardly by spring 53 and fixed to bracket 54. This device applies tension to the shaft 56 and eliminates slackness. The lower end of the shaft 52 is connected to a link 56 which, in turn, is connected by a connecting rod 57 to a lever 58. The lever 58 is pivoted to a support 59 and has its ends connected to a diaphragm 60. The comparator 21 controls the air on the upper end of the diaphragm 71 and thereby causes a motion of the diaphragm 71 against action of spring 74 which, through the linkage, continuously moves rod 22 and, in turn, controls the amount of glass which is permitted to continuously leave the chamber. In this manner, the amount of glass in the chamber is continuously controlled.

Figure 11:
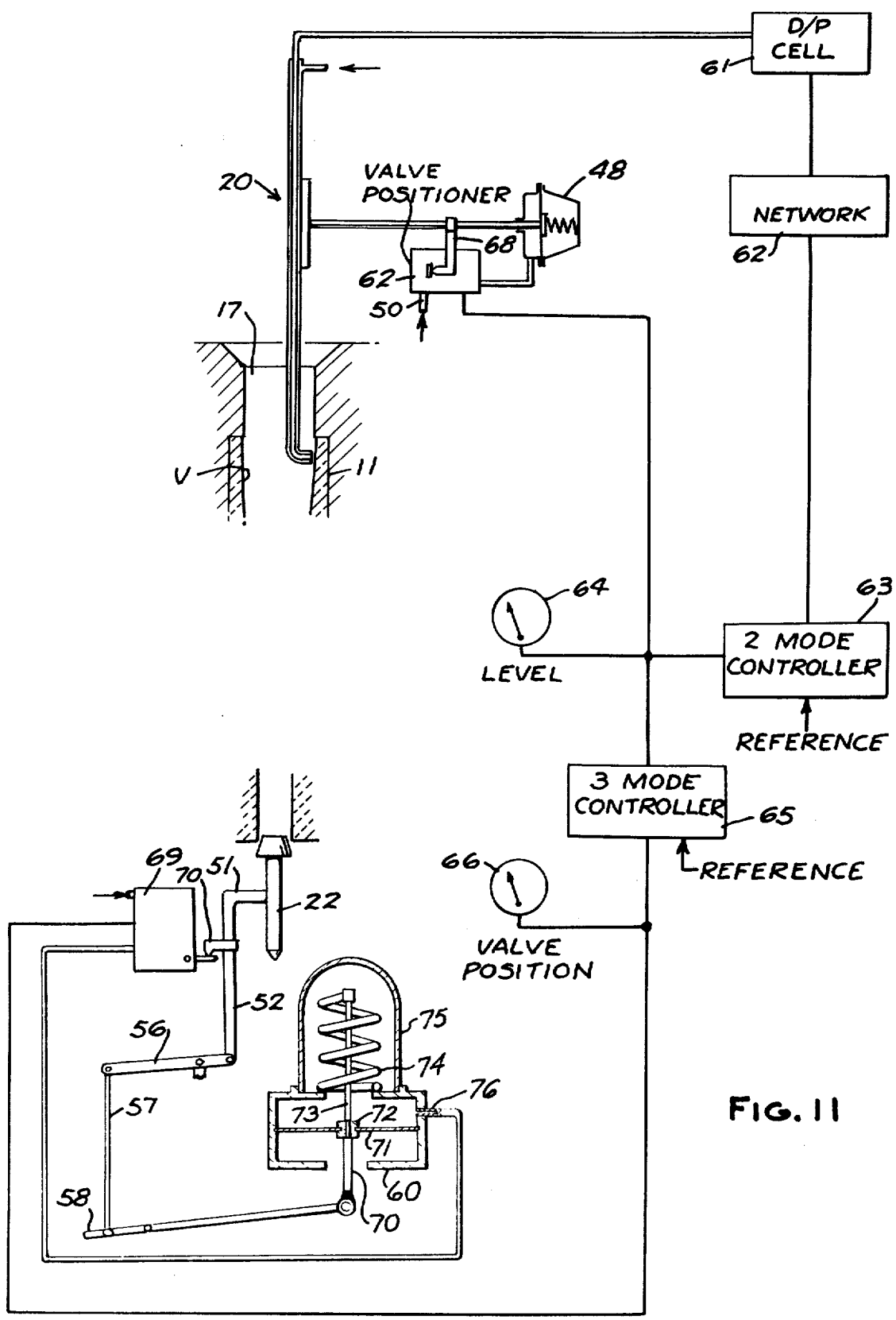
FIG. 11 is a partly diagrammatic block diagram of the control circuit for the apparatus.

Referring to FIG. 11, which shows a block diagram of the comparator 21, any change sensed by the probe 20 when it moves under the action of the constant air pressure through passage 50 is determined by D/P cell 61, and an electrical signal is provided to a compensating network 62 and, in turn, to a 2 mode controller 63. Controller 63 compares the signal to a reference, producing a measure of the diameter and, in turn, the amount of glass on a visual indicator 64. This analog signal passes to a 3 mode controller 65 which compares the signal to a reference corresponding to the amount of glass desired to produce a second signal which indicates the valve position on visual indicator 66 and also sends a signal to control the position of rod 22, and thereby controls the flow of glass out of chamber 12.

Each of the diaphragm motors 48, 60 has an electropneumatic valve actuator with a mechanical follow-up to shafts 46 and 51 to insure accuracy of position of the mechanism being actuated.

Each of the diaphragm type motors 48 and 60 has a pneumatic valve accuator associated therewith, having a mechanical follow-up connected to the shaft 46, as shown in FIG. 5; and shaft 51, as shown in FIG. 1. FIG. 11 shows a diaphragm motor 60 which is a chamber 75 bisected by a flexible diaphragm 71, forming an airtight chamber 75. A tension spring 74 is connected to one end of shaft 73. An air inlet 76 provides a source of air which varies in pressure in a relationship to the varying pressure between molten glass 11 and probe 20. The position of rod 22 is controlled in response to the movement of shaft 73 which, in turn, is controlled by varying the diaphragm 71 in response to the varying air pressure in the gap between the probe and the molten glass.

We claim:

1. In the process of refining molten glass wherein unrefined molten glass is continuously introduced into one end of an open-ended chamber, the chamber is continuously rotated to form a void in the molten glass, said void having an inclined surface and causing the gaseous inclusions to be removed from the glass to the void by the action of centrifugal force and the molten glass is continuously removed from the other end of the rotating chamber, the method of controlling the volume of glass in the chamber which comprises:

positioning a movable probe within the rotating container, said probe comprising concentric tubes positioned relative to each other to provide an annular pressure passage and a central pressure sensing passage;

moving the probe toward a point on the surface of the void while supplying air flowing under a constant pressure through the annular pressure passage;

directing said air flow from the annular pressure passage toward the surface of the rotating molten glass at a surface of the void and sensing by return flow of air a predetermined change in air pressure in the probe as the probe apparatus approaches a predetermined position with respect to the surface of the void;

continuously determining this difference in air pressure between the redirected air pressure in the sensing tube and the pressure of the constant pressure air supplied to the glass surface through the annular pressure passage;

continuously comparing the pressure differences between the flows within a preselected range of pressure differences;

operably and movably connecting said probe to a diaphragm motor; said motor having an air activatable diaphragm which divides the motor into two chambers; supplying air to one chamber of the diaphragm motor and countering the diaphragm movement by a pressure spring in opposition to the force of the air pressure supplied to the chamber of the diaphragm motor;

controlling the air pressure supplied to the diaphragming motor so as to move the diaphragm against the spring and thereby continually urging the probe towards the surface of the rotating glass mass so as to keep the constant pressure stream within redirecting range of the surface of the molten mass;

positioning a chamber flow control device within the outlet of the rotatable chamber; and operably connecting the flow control device so as to respond to any difference in pressure between the constant air pressure applied to the glass surface and the returned sensed air pressure which is outside the range of pre-selected pressure differences so as to move the flow control device to continually regulate the size of the exit of the chamber thereby regulating the volume of the molten glass within the chamber in response to the changes in air pressure differences directed towards the molten glass surfaces whenever the surface of the void changes to a location outside of the preselected range of pressure differences.

2. In an apparatus for refining molten glass wherein molten glass is continuously introduced into one end of an open-ended chamber and the chamber is continuously rotated to form a void in the molten glass, said glass having an inclined surface, to cause gaseous inclusions to be removed from the glass to the void by the action of centrifugal force and wherein molten glass is continuously removed from the other end of the rotating chamber, apparatus for controlling the volume of glass in the chamber which comprises:

a probe, said probe comprising a pair of tubes positioned concentrically to form two air passages, an outer annular pressure passage, and a central pressure sensing passage; siad probe having an air inlet for supplying air to the annular pressure passage;

the central pressure sensing passage providing a passage for returning air;

means for supplying air under a constant pressure through the annular pressure passage and directing said air flow from the annular pressure passage toward the surface of the rotating molten glass at a surface of the void;

comparator means for measuring the pressure difference between the air streams of the two passages and converting the difference to an electric signal, said comparator means being connected to the central pressure passage;

a diaphragm motor, said motor having two chambers;

said probe being movably connected to said diaphragm motor;

means for accepting the electrical signal output of the comparator means and comparing said signal with a range of predetermined signals representing an acceptable range of glass volume in the mass;

means for comparing the signal generated from the comparator means for operating said first diaphragm motor and thereby controlling the position of the probe relative to the surface of the glass mass;

an orifice control device positioned in an orifice blocking manner in another exit of said chamber;

a second diaphragm motor, a force transmitting linkage, said linkage transmitting force from the second motor to the orifice control device;

said second diaphragm motor being electrically connected to the comparator means so as to respond to air pressure differences in probe for controlling the outlet of said chamber and thereby controlling the volume of glass in the chamber.

* * * * *